United States Patent [19]

Liene

[11] Patent Number: 5,520,873
[45] Date of Patent: May 28, 1996

[54] PRODUCTION OF FOAM BOARDS HAVING IMPROVED SOUND INSULATION PROPERTIES

[75] Inventor: Werner Liene, Mannheim, Germany

[73] Assignee: BASF Aktiengesellschaft, Ludwigshafen, Germany

[21] Appl. No.: 300,182

[22] Filed: Sep. 2, 1994

[30] Foreign Application Priority Data

Sep. 8, 1993 [DE] Germany ............ 43 30 314.5

[51] Int. Cl.$^6$ ............ B29C 67/20
[52] U.S. Cl. ............ 264/294; 264/321
[58] Field of Search ............ 264/321, 45.4, 264/294

[56] References Cited

U.S. PATENT DOCUMENTS

| | | | |
|---|---|---|---|
| 2,899,708 | 8/1959 | Donaldson et al. | 264/321 |
| 3,125,621 | 3/1964 | Coppick | 264/321 |
| 3,243,485 | 3/1966 | Griffin | 264/321 |
| 3,334,169 | 8/1967 | Erceg et al. | 264/321 |
| 3,895,086 | 7/1975 | Berner | 264/45.4 |
| 4,075,303 | 2/1978 | Yarwood et al. | 264/43 |
| 4,239,727 | 12/1980 | Moyers et al. | 264/321 |
| 4,510,268 | 4/1985 | Tonokawa et al. | 264/321 |
| 5,039,462 | 8/1991 | Chilko et al. | 425/406 |

FOREIGN PATENT DOCUMENTS

| | | |
|---|---|---|
| 062882 | 10/1982 | European Pat. Off. . |
| 151183 | 8/1985 | European Pat. Off. . |
| 422281 | 4/1991 | European Pat. Off. . |
| 2040948 | 9/1980 | United Kingdom . |

*Primary Examiner*—Allan R. Kuhns
*Attorney, Agent, or Firm*—Keil & Weinkauf

[57] ABSTRACT

Foam boards are produced by aftertreating customary and known foam boards by compression by compressing foam boards having a density of from 17 to 30 kg/m$^3$ to a maximum extent of from 60 to 90% of their original thickness, releasing the compression, and repeating this process at least once.

1 Claim, No Drawings

PRODUCTION OF FOAM BOARDS HAVING IMPROVED SOUND INSULATION PROPERTIES

BACKGROUND OF THE INVENTION

The present invention relates to a process for producing foam boards having improved sound insulation properties. In particular, the present invention relates to a process for aftertreating known foam boards by repeated compression.

Foam boards, for example made of polyolefin foams or made of polystyrene extruded or particle foam, have long been employed for thermal and sound insulation.

For sound insulation, in particular footfall sound insulation, preference is given to foam boards which have been elasticized by temporary compression in the direction of the board thickness.

For example, the use of elasticized EPS (expandable polystyrene) insulating boards for footfall sound insulation in accordance with DIN 18164 Part 2, Schaumkunststoffe als Dämmstoffe für das Bauwesen, is known. Boards of this type must have adequate resilience. The resilience is characterized in DIN 18 164 Part 2 in terms of the dynamic rigidity s' (also known as the impact sound reduction factor) of the insulating layer, including the air trapped in it.

For structural engineering reasons, footfall sound insulation boards must have a very low dynamic rigidity and a relatively highly restricted deformation under load (difference between the supplied or nominal thickness and the thickness under load, expressed as the $(d_L-d_B)$ value of DIN 18164 Part 2).

This means that the degree of compression (also known as the degree of elasticization), and thus the deformation, of the foam structure can only be varied to a very limited extent.

In the known aftertreatment of foam boards by compression (also known as elasticization), foam boards typically having a density of from 8 to 10 kg/m³ are compressed once to a maximum extent of 66% of their original thickness, and this is maintained for a certain time (usually less than 60 seconds).

After the pressure is removed, a slight irreversible deformation of the cell structure remains, the cells having an anisotropy such that the ratio between the long and short axes is from 1.15 to 1.25. The dynamic rigidity values achieved, for example in a 25 mm thick foam board made of polystyrene particle foam, are around 10 MN/m³. The $(d_L-d_B)$ values are from about 1 to 3 mm. Here it is frequently difficult to achieve dynamic rigidity values of not greater than 10 MN/m³ reproducibly.

It is an object of the present invention to improve the sound insulation properties of the known foam boards and in particular achieve simple and reliable control thereof.

SUMMARY OF THE INVENTION

We have found, surprisingly, that this object is achieved by a process for producing foam boards having a dynamic rigidity of not greater than 10 MN/m³ by aftertreating customary and known foam boards by compression, which comprises compressing foam boards having a density of from 17 to 30 kg/m³ to a maximum extent of from 60 to 90% of their original thickness, releasing the compression, and repeating this process at least once.

DESCRIPTION OF THE PREFERRED EMBODIMENTS

German Patent Application P 42 08 759.7 describes foam boards having an anisotropy such that the cells are compressed in the direction of the board thickness, the foam boards having a density within the range from 15 to 45 kg/m³ and the ratio between the long and short axes in the compressed cells being within the range from 1.2 to 1.6.

It also describes a process for producing these foam boards by temporary compression of conventional and known foam boards, which comprises compressing foam boards having a density of from 11 to 40 kg/m³ to a maximum extent of from 50 to 90% of their original thickness, maintaining this compression for at least 10 seconds, and subsequently releasing the compression.

Foam boards or slabs can be employed in the process according to the invention. In general, however, foam slabs are employed, from which foam boards are subsequently cut in a suitable size in a conventional and known manner perpendicular to the elasticization direction.

This allows the process according to the invention to be carried out in a very economical manner in one step for a multiplicity of future foam boards. In addition, there are no problems caused by edge effects.

The terms foam slab and foam board are therefore used synonymously in the description, unless stated otherwise at the point in question.

The foam boards can comprise closed- or open-cell polyolefin foam, phenolic resin foam, polystyrene foam or polyurethane foam. Preference is predominantly given to closed-cell foams, in particular made from polystyrene, polyurethanes and polyolefins.

The foam boards very particularly preferably comprise polystyrene foam. Preference is given to polystyrene particle foam as opposed to extruded polystyrene foam.

The preferably isotropic foam boards on which the foam boards according to the invention are based are produced in a conventional and known manner.

For example, foam slabs are produced from polystyrene particle foam by expanding blowing agent-containing, expandable polystyrene beads by heating at above their melting point, for example by means of hot air or preferably by means of steam. After cooling and if desired interim storage, the foam particles obtained can be welded together by reheating in a mold which does not seal in a gas-tight manner to give a foam slab.

Suitable expandable polystyrene beads are described, for example, in EP-B-106 129, EP-A-383 133 and DE-A-39 15 602.

Preference is given to expandable polystyrene beads having a size of from 1 to 2 mm.

The freshly produced foam boards are preferably stored for at least 3 hours and particularly preferably for at least 20 hours before the process according to the invention is carried out. This ensures a better re-expansion of the compressed boards and also the achievement of smaller $(d_L-d_B)$ values.

The known foam boards or slabs employed in the process according to the invention generally have a density of from 17 to 30 kg/m³.

By comparison, the foam boards or slabs which have been subjected to the process of the invention generally have a density of from 5 to 35 kg/m³.

As a consequence of carrying out the process according to the invention, the density of the foam slabs can be permanently increased by up to 30%, based on the pre-process density.

In the process according to the invention, the foam slabs are generally compressed in the direction of a surface perpendicular to a maximum extent of from 60 to 90%, preferably from 70 to 85%, particularly preferably from 70 to 80%, of their original thickness, repeatedly, ie. at least twice. Depending on the desired dynamic rigidity $\leq 10$ MN/m$^3$, the foam boards can be repeatedly compressed to a maximum extent of 90% using certain programs for the compression rate and subsequent release.

In general, the compression is carried out by moving two plane-parallel metal plates toward one another at a constant compression rate and without interim hold times to a maximum compression. At the maximum compression, the slabs are preferably released immediately, and the distance between the two metal plates is then increased again, in general likewise at a constant release rate.

The compression process is carried out repeatedly according to the invention, the number of compression processes being chosen with regard to the desired property. To improve the dynamic rigidity, it is advantageous to use preferably from 5 to 10 compression processes.

The compression rate used is generally from 1 to 300 cm/min, preferably from 30 to 95 cm/min, particularly preferably from 70 to 80 cm/min.

The compression can be carried out in a conventional and known manner in presses for EPS.

After complete release, the foam slabs aftertreated by the process according to the invention are generally stored under atmospheric conditions for at least 1 day. This enables the foam slabs to relax to their final dimensions.

Foam boards can then be obtained from these foam slabs by cutting perpendicular to the elasticization direction in a conventional and known manner. These foam boards preferably have a thickness of from 30 to 120 mm.

The process of the invention, in addition to improving the dynamic rigidity s' of the foam boards, has the advantage that a reduced thermal conductivity is achieved thereby.

EXAMPLES AND COMPARATIVE EXAMPLES

The Examples and Comparative Examples were carried out using foam boards made of polystyrene particle foam.

The compression was carried out in a press between two plane-parallel plates at a force of 25 MP and a rate of 75 cm/min for a total of five times. Once the maximum compression was reached, the two plates were immediately moved apart again at a rate of 192 cm/min.

After release, the compressed boards were stored for 2 days under atmospheric pressure, at which point the board thickness was determined.

The compression-aftertreated foam boards and untreated foam boards were measured in respect of the dynamic rigidity and the $(d_L-D_B)$ value in accordance with DIN 18 164 Part 2 and in some instances in respect of the thermal conductivity in accordance with DIN 52 612 Part 1.

The results are depicted in the table. The comparison of the Examples and Comparative Examples shows that the process of the invention gives foam boards having improved dynamic rigidity values. What is more, these values are achievable particularly easily and reproducibly.

TABLE

|  | Density before compression kg/m$^3$ | Density after compression kg/m$^3$ | Max. compression % | Number of compressions n | Board thickness mm | $d_L-d_B$ mm | Dyn. rigidity MN/m$^3$ | Thermal conductivity at 10° C. mW/mK |
|---|---|---|---|---|---|---|---|---|
| Example 1 | 17 | 21.8 | 76 | 5 | 60 | 1.4 | 6.0 | 33.2 |
| Comp. Example 2 | 17 | — | 0 | 0 | 40 | 0 | 55.7 | 36.3 |
| Comp. Example 1 | 17 | 20.6 | 76 | 1 | 60 | 0.4 | 22.9 |  |
| Example 2 | 17 | 22.0 | 76 | 5 | 40 | 1.5 | 9.8 |  |

We claim:

1. A process for producing foam boards having a dynamic rigidity of not greater than 10 MN/m$^3$ by aftertreating customary and known foam boards by compression, which comprises the steps of:
   a) compressing an existing foam board having a density of from 17 to 30 kg/m$^3$ to a maximum extent of from 60 to 90% of its original thickness,
   b) releasing the compression from the compressed foam board, and
   c) repeating steps a) and b) from 5 to 10 times.

* * * * *